United States Patent
Tronc (10) Patent No.: US 12,030,287 B2
(45) Date of Patent: Jul. 9, 2024

(54) FLEXIBLE UNDERWATER PIPE INCLUDING A LAYER INCLUDING A POLYETHYLENE HAVING ENHANCED HEAT RESISTANCE

(71) Applicant: TECHNIP FRANCE, Courbevoie (FR)

(72) Inventor: Frédéric Tronc, Rouen (FR)

(73) Assignee: TECHNIP FRANCE (FR)

( * ) Notice: Subject to any disclaimer, the term of this patent is extended or adjusted under 35 U.S.C. 154(b) by 736 days.

(21) Appl. No.: 14/419,087

(22) PCT Filed: Jul. 31, 2013

(86) PCT No.: PCT/EP2013/066060
§ 371 (c)(1),
(2) Date: Feb. 2, 2015

(87) PCT Pub. No.: WO2014/020053
PCT Pub. Date: Feb. 6, 2014

(65) Prior Publication Data
US 2015/0159785 A1 Jun. 11, 2015

(30) Foreign Application Priority Data
Aug. 3, 2012 (FR) .................................... 12 57591

(51) Int. Cl.
| | | |
|---|---|---|
| *B32B 27/32* | (2006.01) | |
| *B29C 48/151* | (2019.01) | |
| *B32B 1/08* | (2006.01) | |
| *F16L 11/08* | (2006.01) | |
| *F16L 11/10* | (2006.01) | |
| *F16L 11/12* | (2006.01) | |
| *B29L 9/00* | (2006.01) | |
| *B29L 23/00* | (2006.01) | |

(52) U.S. Cl.
CPC ............ *B32B 27/32* (2013.01); *B29C 48/151* (2019.02); *B32B 1/08* (2013.01); *F16L 11/087* (2013.01); *F16L 11/10* (2013.01); *F16L 11/125* (2013.01); *B29K 2023/06* (2013.01); *B29K 2995/0016* (2013.01); *B29L 2009/00* (2013.01); *B29L 2023/22* (2013.01); *B32B 2270/00* (2013.01); *B32B 2307/7265* (2013.01); *B32B 2323/043* (2013.01); *B32B 2597/00* (2013.01)

(58) Field of Classification Search
CPC . F16L 11/083; F16L 11/12; Y10T 428/12292; B29C 48/151; B32B 1/08; B32B 27/32; B32B 2270/00; B32B 2307/7265; B32B 2323/043; B32B 2597/00; B29L 2009/00; B29L 2023/22; B29K 2023/06; B29K 2995/0016
USPC .............. 428/36.91, 421, 458, 469
See application file for complete search history.

(56) References Cited

U.S. PATENT DOCUMENTS

| | | | | |
|---|---|---|---|---|
| 5,908,679 | A | 6/1999 | Berthold et al. | 428/36.9 |
| 6,110,550 | A * | 8/2000 | Jarrin | F16L 11/083 |
| | | | | 138/131 |
| 6,878,784 | B1 | 4/2005 | Asumalahti | 526/64 |
| 2003/0198769 | A1 | 10/2003 | Jing et al. | 428/36.91 |
| 2004/0058113 | A1 | 3/2004 | Werth | 428/36.91 |
| 2004/0219317 | A1 | 11/2004 | Belcher | |
| 2008/0190507 | A1 | 8/2008 | Hardy | 138/134 |
| 2010/0178443 | A1 | 7/2010 | Bäckman et al. | 428/36.9 |
| 2011/0118417 | A1 | 5/2011 | Liu et al. | 525/240 |
| 2011/0120583 | A1* | 5/2011 | Coutarel | B32B 1/08 |
| | | | | 138/138 |

FOREIGN PATENT DOCUMENTS

| | | |
|---|---|---|
| CA | 2064226 | 12/1991 |
| CN | 1291544 A | 4/2001 |
| CN | 1437619 A | 8/2003 |
| CN | 1668690 A | 9/2005 |
| CN | 101045354 A | 10/2007 |
| CN | 101583491 A | 11/2009 |
| CN | 201795184 U | 4/2011 |
| CN | 102128317 A | 7/2011 |
| CN | 202074144 U | 12/2011 |
| CN | 102365488 A | 2/2012 |
| CN | 102432944 A | 5/2012 |
| EP | 0 100 879 | 2/1984 |
| EP | 0 416 815 A2 | 3/1991 |
| EP | 1 652 664 A1 | 5/2006 |
| JP | 05016294 * | 1/1993 |
| WO | WO 94/03509 | 2/1994 |
| WO | WO 03/078134 | 9/2003 |
| WO | WO 2006/090092 A1 | 8/2006 |
| WO | WO 2006/120320 A1 | 11/2006 |
| WO | WO 2010/096935 A1 | 9/2010 |
| WO | WO 2012/028262 A1 | 3/2012 |
| WO | WO 2012/030221 A1 | 3/2012 |

OTHER PUBLICATIONS

Songhan Plastic Technology Total 3802 B HDPE Data Sheet.*
Polyethylene HDPE XRT 70 Data Sheet (Year: 2012).*
Data Sheet Polyethylene 3802.*
TUB 121 Polyethylene Copolymer, *INEOS Olefins & Polymers USA*.
Raja et al., "Evaluation of blistering performance of pigmented and unpigmented alkyd coatings using electrochemical impedance spectroscopy".
"Standard Specification for Polyethylene of Raised Temperature (PE-RT) SDR 9 Tubing," *ASTM International*, Designation: F-2623-08.
"Standard Specification for Polyethylene Plastics Pipe and Fittings Materials," *ASTM International*, Designation: D3350-12.
"Standard Specification for Polyethylene of Raised Temperature (PE-RT) Plastic Hot and Cold-Water Tubing and Distribution Systems," *ASTM International*, Designation: F2769-10.

(Continued)

*Primary Examiner* — James C Yager
(74) *Attorney, Agent, or Firm* — OSTROLENK FABER LLP (57) ABSTRACT

A flexible underwater pipe for transporting hydrocarbons, including a plurality of layers, at least one of which includes a polyethylene having enhanced heat resistance, to its preparation method and to its use for transporting hydrocarbons.

15 Claims, 1 Drawing Sheet

(56) References Cited

OTHER PUBLICATIONS

"Plastics piping systems for industrial applications—Polybutene (PB), polyethylene (PE), polyethylene of raised temperature resistance (PE-RT), crosslinked polyethylene (PE-X), polypropylene (PP)—Metric series for specifications for components and the system (ISO 15494:2015)," *International Standard* (2015).
"Plastics piping systems for hot and cold water installations—Polyethylene of raised temperature resistance (PE-RT)—Part 2:Pipes (ISO 22391-2:2009)," *International Standard* (2009).
"Plastics piping systems for industrial applications—Polybutene (PB), polyethylene (PE), polypropylene (PP), crosslinked polyethylene (PE-X), polyethylene of raised temperature resistance (PE-RT)—Part 1: Specifications for components and system—Metric series (ISO 15494-1)," *International Standard* (2011).
Technical Data Sheet of Polyethylene HDPE XRT 70, Rev: Jun. 2012, p. 1/1.
EN ISO 13479 : 1997-09, 11 pages, Sep. 1997.
Technical Data Sheet of Hostalen CRP 100 RT Black, Aug. 27, 2019, pp. 1-3, LyondellBasell.
Technical Data Sheet of Eraclene PF 92, Dec. 2019, pp. 1-2.
Technical Data Sheet of Kynar Superflex 2500-20, 2019, two pages.
Declaration of Frédéric tronc, Feb. 2020, pp. 1-7.
ISO 1133, according to ulprospector, https://plastics.ulprospector.com/properties/ISO1, Jun. 8, 2020, pp. 1-3.
Eltex® TUB 121 Black, BP Solvay Polyethylene, Jul. 2004.
Eltex TUB 121 regression data, Jul. 28, 2003.
INEOS, Certificate of Analysis, Jul. 19, 2011.
Eltex® TUB 125 N2025 Orange, Sep. 2006.
INEOS, Certificate of Analysis, Aug. 9, 2011.
Eltex® TUB 121, Apr. 2015.
Recommended Practice for Flexible Pipe, ANSI/API Recommended Practice 17B, Fourth Edition, Jul. 2008.
Polyethylene BorSafe™ HE3490-LS-H, Black Bimodal PE100 Polyethylene for Pressure Pipes, Mar. 2012.
Plast Symboler og forkortede termer, Del 1:Grunnpolymerer og deres spesielle egenskaper, Norsk Standard, NS-EN ISO 1043-1:2011, 2011.
Polyethylene of raised temperature resistance (PE-RT) pipes—Effect of time and temperature on the expected strength, Dansk standard, DS/ISO 24033, Apr. 20, 2009.
Specification for Unbonded Flexible Pipe, ANSI/API Specification 17J, Twenty-Third Edition, Jul. 2008.
PE-RT: A New Class of Polyethylene for Industrial Pipes, 25th International Conference on Offshore Mechanics and Arctic Engineering, Hamburg, Germany, Jun. 4-9, 2006.
MD A. Parvez et al., Suitability of Reinforced Thermoplastic Pipe in Crude Oil Containing Aromatic Solvents up to 82° C. and Integrity Assessment of RTP Through Cut-Out Sample Analysis, Rio Pipeline 2011 Conference & Exposition, Sep. 20-22, 2011.
Communication of a Notice of Opposition dated Mar. 7, 2017 issued in European Patent No. 2880348.
Opposition dated Feb. 27, 2017 against European Patent No. 2880348.
International Search Report dated Sep. 16, 2013 issued in corresponding International patent application No. PCT/EP2013/066060.
Database WPI Week 201136 Thomson Scientific, London, GB; AN 2011-F46302 XP002694989,—& CN 201 795 184 (Zhejiang Gaofeng Holding Group Corp) Apr. 13, 2011 abstract.
Database WPI Week 200821 Thomson Scientific, London, GB; AN 2008-C81399 XP002694990,—& CN 101 045 354 (Lin S) Oct. 3, 2007 abstract.
Database WPI Week 201164 Thomson Scientific, London, GB; AN 2011-K33136 XP002694991,—& CN 102 128 317 (Guangdong Liansu Technology Ind Co Ltd) Jul. 20, 2011 abstract.
Songhan Plastic Technology Ltd., Total Lacqtene® 2001 PVK 44 HDPE pipe (**discontinued), Datasheet, 2 pages.
Intrepid™ 2499 NT Technical Information, Bimordal Polyethylene Resin, Rev. Jul. 11, 2012, 2 pages.
Intrepid™ 2499 NT Datasheet, Bimordal Polyethylene Resin, 2 pages.
New PE-RT resin completes portfolio used in hot water pipe applications, LyondellBasell Industries, Feb. 16, 2008.
Hostalen 4731 B, Introducing a new PE-RT Type II material Datasheet.
Wellstream Flexsteel™ Flexible Steel Pipe, Technical, Operating, and Maintenance Manual; WSI Eng. Doc. No. R092E004, Revision 05, Nov. 13, 2006.
EPO Communication dated May 7, 2018 issued in EP Patent No. 2880348.
Chevron Philips Marlex® HP076 High Density Polyethylene, Pipe Grade, Datasheet, 1 pagw.
Marlex® HP076 High Density Polyethylene Copolymer Datasheet, 1 page.
Total Lacqtene® 2001 TN HDPE pipe (discontinued **), Datasheet, 2 pages.
Handbook of Materials Selection for Engineering Applications, George Murray, 1997, pp. 388-389.
B. Flaconnèche et al: "Permeability, Diffusion and Solubility of Gases in Polyethylene, Polyamide 11 and Poly(vinylidene fluoride)", *Oil & Gas Science and Technology—Rev. IFP*, vol. 56 (2001), No. 3, pp. 261-278.
EPO Communication dated Jun. 27, 2018 re Third Party Observations against EP Patent No. 2880348.
Internal data showing the blistering resistance of a range of polyethylenes, 2 pages.
Eltex® TUB 172 Datasheet, Jun. 2011, 2 pages.
Eltex® TUB 125 N2025 Orange Data Sheet, Sep. 2006, 2 pa ges.
Eltex® TUB 220-RT,Datasheet, 6 pages.
High Density Polyethylene GP100OR Datasheet, Review 8 (Nov. 2017).
High Density Polyethylene GP100ORXP Datasheet, Review 4 (Apr. 2018).
Dowlex™ 2377 Polyethylene Resin for Industrial Pipe Applications, The Dow Chemical Company, Mar. 2011.
EPO Communication dated Jul. 25, 2018 re Decision of the Opposition Division maintaining EP 2880348 as granted.
EPO Communication dated Dec. 7, 2018 re Third Party Observations against EP Patent No. 2880348.
Internal data showing the blistering resistance of a range of polyethylenes.
Declaration of Mark Laycock dated Nov. 29, 2018.
Declaration of Glyn Morgan dated Nov. 30, 2018.
Eltex® B4922N3004 Product Technical Information, Dec. 2015, 2 pages.
Eltex® B4922N3004 EXP JB7 Product Technical Information, Jan. 2015, 2 pages.
Polyethylene HDPE XRT 70 Technical Datasheet (Rev. Aug. 2013) 2 pages.
Dow™ DGDA-2399 PE-RT Technical Datasheet, 2 pages.
Marlex® HHM 4903 Polyethylene, (Revision Date: Aug. 2016), 1 page.
ExxonMobile Escorene® HD-6704 HDPE, Injection Grade (discontinued**) Datasheet.
International Standard: ISO 1167-1, Thermoplastics pipes, fittings and assemblies for the conveyance of fluids—Determination of the resistance to internal pressure—Part 1: General Method, First edition Feb. 1, 2006, Reference No. ISO 1167-1:2006(E), 16 pages.
Ashish M. Sukhadia et al.: Assessing the Slow Crack Growth Resistance of Polyethylene Resins and Pipe Service Lifetimes Predictions, Sep. 2010.
PE 100 pipe system, Heiner Bromstrup (ed.)—Essen: Vulkan-Verl., 2000, ISBN 3-8027-2719-3, 5 pages.
Driscopipe® 8100 Series Polyethylene Piping Produced From PE 4710-PE100 Material, Bulletin: PP 302, May 2006 Supercedes all previous publications, 12 pages.
XSene XRT 70 Versatile PERT Type II for durable pipe systems, 2 pages.
ASTM D638-14 Standard Test Method for Tensile Properties of Plastics, https://www.astm.org/Standards/D638 (accessed Mar. 20, 2019), 9 pages.

(56) References Cited

OTHER PUBLICATIONS

Zwick/Roell: ISO 527 and ASTM D638—explaining the difference, 5 pages.
Hostalen CRP 100 Orange Technical Datasheet, 3 pages.
Polimaxx R1760 High Density Polyethylene (HDPE), Rev. 20110601, 1 page.
Declaration of Guillaume Petition dated Apr. 17, 2019, 5 pages.
Rapport de l'IFPEN sur les tests de résistance au phénomène de cloquage rés a 700 bar et 90° C. sur les 30 échantillons de XRT 70, dated Dec. 18, 2014, 18 pages.
Résultats de résistance au phénomène de cloquage de PE, 6 pages.
Technical Report issued Jul. 2, 2019 in corresponding Brazilian Patent Application No. BR112015002088-7.

* cited by examiner

FLEXIBLE UNDERWATER PIPE INCLUDING A LAYER INCLUDING A POLYETHYLENE HAVING ENHANCED HEAT RESISTANCE

CROSS REFERENCE TO RELATED APPLICATIONS

The present application is a 35 U.S.C. § 371 National Phase conversion of PCT/EP2013/066060, filed Jul. 31, 2013, which claims benefit of French Application No. 12 57591, filed Aug. 3, 2012, the disclosure of which is incorporated herein by reference. The PCT International Application was published in the French language.

TECHNICAL FIELD OF THE INVENTION

The present invention relates to a flexible underwater pipe intended for transport of hydrocarbons in deep water.

BACKGROUND OF THE INVENTION

Flexible pipes for transporting hydrocarbons generally include from the outside towards the inside of the pipe:
an external polymeric sealing sheath for protecting the whole of the pipe and notably for preventing seawater from penetrating into its thickness,
plies of tensile armors,
a pressure vault,
an internal polymeric sealing sheath, and
optionally a metal carcass (FIGURE).

If the pipe comprises a metal carcass, it is said to be a rough-bore pipe. If the conduit is free from metal carcass, it is said to be a smooth-bore pipe. Generally for transporting hydrocarbons, a pipe including a carcass is preferred, while a pipe free from carcass will be suitable for transporting water and/or pressurized steam.

The metal carcass and the pressure vault consist of longitudinal elements wound with a short pitch, and they give the pipe its resistance to radial forces while the plies of tensile armors consist of metal wires wound according to long pitches in order to spread the load of the axial forces.

The nature, the number, the dimensioning and the organization of the layers making up the flexible pipes are essentially related to their conditions of use and installation. The pipes may comprise layers in addition to the aforementioned ones, for example one or several intermediate polymeric layers (a so called "intermediate polymeric sheath") which are located between two aforementioned adjacent layers and which participate in isolating the flexible pipe.

In the present application, the notion of winding with a short pitch refers to any helical winding according to a helix angle close to 90°, typically comprised between 75° and 90°. The notion of a winding with a long pitch, as for it, covers helix angles of less than 55°, typically comprised between 25° and 55° for armor plies.

These flexible pipes are notably suitable for transporting fluids, notably hydrocarbons in sea beds and this, at great depths. More specifically, they are said to be of the unbonded type and they are thus described in normative documents published by the American Petroleum Institute (API), API 17J ($3^{rd}$ edition—Jan. 1, 2009) and API RP 17B ($3^{rd}$ edition—March 2002).

The flexible pipes may be used at a great depth, typically down to 2,500 meters of depth and advantageously down to 3,000 meters. They allow transport of fluids, notably of hydrocarbons, having a temperature typically attaining 130° C. and which may even exceed 150° C. and at an internal pressure which may attain 1,000 bars, or even 1,500 bars.

The constitutive material of the polymeric sealing sheath has to be chemically stable and capable of mechanically withstanding the transported fluid and its characteristics (composition, temperature and pressure). The material should combine characteristics of ductility, of resistance over time (generally the pipe should have a lifetime of at least 20 years), of mechanical strength to heat and pressure. The material should notably be chemically inert towards chemical compounds forming the transported fluid. Typically, the transported hydrocarbons comprise crude oil, water and pressurized gases.

Various polymeric materials are used as an internal, intermediate or external sealed polymeric sheath, in particular polyethylene (PE), either cross-linked or not. The polyethylene may notably be high density polyethylene (HDPE).

For example, patent application CA 2,064,226 (CO-FLEXIP) describes a flexible tubular pipe for transporting hydrocarbons comprising an internal sealing sheath comprising a silane-grafted polyethylene and cross-linked by hydrolysis and coupling of the silanes. Application WO 03/078134 (NKT FLEXIBLES) describes a flexible tubular pipe for transporting hydrocarbons comprising a sealing sheath comprising a cross-linked polyethylene by treatment of peroxides with electromagnetic radiations. Application WO 2004/065092 (WELLSTREAM INTERNATIONAL LIMITED) describes a flexible tubular pipe for transporting hydrocarbons comprising a sealing sheath comprising a cross-linked polyethylene by irradiation with electron beams.

Nevertheless, a sheath based on polyethylene may be subject to the blistering phenomenon. In a flexible pipe, the sealing sheath in polymeric material is used for transporting fluids consisting of crude oil, water and pressurized gas and at a temperature. Under these conditions of use, the polymeric material of the sealing sheath absorbs the gases contained in the petroleum fluid depending on their chemical nature (via their solubility coefficient) and on the partial pressure of each of them. The saturation time of the polymer, equilibration of the system, as for it depends on the diffusion coefficients and therefore essentially on the temperature. If the pressure in the flexible pipe were to be reduced, the absorbed gases would tend to be extracted from the polymer in order to maintain the equilibrium between the internal and external concentrations. If the breaking of the equilibrium is very rapid, more rapid than the diffusion rate of the gases out of the polymer (like in the case of a production shutdown), the system is no longer at equilibrium. Oversaturation of gas in the polymeric sheath leads to gas concentration and temperature gradients which may generate a more or less significant sudden expansion of gases (rapid gas decompression) which may generate irreversible damage such as the occurrence of blisters or cracks or even the formation of microporosity uniformly distributed in the thickness of the material. Thus, the occurrence of blisters is due to trapping of soluble gases within the sheath or to the too rapid decompression of the pipe not allowing the gas to diffuse out of the sheath. This blistering phenomenon may be a catastrophe for the sealing sheath, and therefore for the flexible pipe which contains it, since it may lead to the loss of its sealing function.

Typically, the blistering phenomenon is observed for a sealing sheath based on polyethylene, either cross-linked or not, in contact with a petroleum fluid including corrosive gases which may diffuse within the sheath, under a high pressure (greater than 200 bars) at a temperature of the order of 60° C. for non-cross-linked polyethylenes, and 90° C. for cross-linked polyethylenes. Thus, in order to guarantee a lifetime of at least 20 years of the flexible pipe, for a pressure of 200 bars, a flexible pipe for which one sealing sheath is in non-cross-linked or cross-linked polyethylene cannot be used at temperatures greater than 60° C. and 90° C. respectively.

Therefore, alternative polymeric materials to polyethylene were developed for internal, intermediate or external polymeric sealing sheaths, notably:

polyamide (PA), notably polyamide 11. Unlike polyethylene, polyamide has good resistance to blistering, as well as a low tendency to swell when it is in contact with petroleum fluid. The polyamide is generally used for hydrocarbon transport conditions for which the pressure is high and where the temperature may be rise up to 110° C. On the other hand, one of the drawbacks of polyamide is that it tends to hydrolyze in the presence of water (often contained in production crudes). Hydrolysis is rapid when it is subject to temperatures (of the order of 110° C. and more) and to high pH values (pH greater than 7). Another drawback is its purchase cost which is substantially greater than that of polyethylene.

polyvinylidene fluoride (PVDF) (which contains more or less plasticizer depending on the grade used) has very good chemical inertia. Sheaths based on PVDF may support high operating pressures as well as temperatures which may attain 130 to 150° C. Its major drawback remains its price, much higher than that of polyethylene or polyamide.

Thus, the internal, intermediate or external polymeric sealing sheaths based on polyamide or polyvinylidene fluoride are less subject to a blistering phenomenon than sheaths based on polyethylene, either cross-linked or not, but they are more expensive and more subject to degradation by hydrolysis in the case of a sheath based on polyamide.

One of the objects of the present invention is to provide a flexible underwater pipe for transporting hydrocarbons, for which the internal, intermediate and/or external polymeric sealing sheath(s) is(are) less subject, or even not at all, to a blistering phenomenon, and for higher temperatures and/or pressures than pipes comprising sheaths based on polyethylene, either cross-linked or not, while retaining the mechanical properties of the sheath(s).

SUMMARY OF THE INVENTION

For this purpose, according to a first object, the invention relates to a flexible underwater pipe intended for transporting hydrocarbons, comprising a plurality of layers, at least one layer of which comprises a polyethylene with enhanced heat resistance (PE-RT).

The inventor actually discovered that a layer comprising a polyethylene with enhanced heat resistance is less subject, or even not at all, to a blistering phenomenon than a layer based on polyethylene, either cross-linked or not, presently used as a sealing sheath of a flexible pipe, and this even at higher temperatures and/or pressures. Such a layer is therefore particularly suitable for being used a sealing sheath in a flexible pipe.

Polyethylenes with enhanced heat resistance or polyethylenes of raised temperature resistance ("polyethylene raised temperature" or "polyethylene of raised temperature" or "polyethylene of raised temperature resistance" PE-RT) are defined in the standards: ASTM F2769-10 revised in 2010, ASTM F2623 revised in 2008 or the ISO 1043-1 standards revised in 2011, ISO 24033 standard revised in 2009 and ISO 22391 standard revised in 2009 and the ISO 15494 standard revised in 2003 for applications.

Polyethylenes with enhanced heat resistance of type I or of type II may be used in the layer of the pipe, those of type II (with higher density) being preferred because they generally better withstand high pressures and/or temperatures.

Polyethylenes with enhanced heat resistance are high density polyethylenes (HDPE) obtained by polymerization in the presence of specific catalysts of ethylene and of one or several α-olefin co-monomers including at least three carbon atoms, generally from 3 to 14 carbon atoms, preferentially from 4 to 12 carbon atoms, more preferentially from 6 to 10 carbon atoms and even more preferentially from 6 to 8 carbon atoms (which leads to polyethylenes with enhanced heat resistance, the side chains of which generally have 1 to 12 carbon atoms, preferably from 2 to 10 carbon atoms, more preferentially from 4 to 8 carbon atoms and even more preferentially from 4 to 6 carbon atoms). Thus, the co-monomers polymerized in the presence of ethylene may be propylene, 1-butene, isobutylene, 4-methyl-1-pentene, 1-hexene, 1-octene, 1-decene. The layer of the flexible pipe according to the invention typically comprises a polyethylene with enhanced heat resistance obtained by polymerization of ethylene and of an α-olefin selected from 1-butene, 1-hexene and 1-octene, preferably 1-hexene and 1-octene. Such polyethylenes with enhanced heat resistance therefore have ethyl, n-butyl or n-hexyl, preferably n-butyl or n-hexyl side chains.

The polyethylenes with enhanced heat resistance are not cross-linked polyethylenes.

Methods for preparing polyethylene with enhanced heat resistance applying specific catalysts, are known from the literature, and are for example described in patent applications EP 0 416 815, WO 94/03509, EP 0 100 879. By using dedicated catalysts it is possible to obtain copolymers derived from ethylene/α-olefin monomers and the molecular structures of which (controlled distribution of the co-monomer) and crystalline structures give them high performances in terms of resistance to hydrostatic pressure up to high temperatures for non-cross-linked polyolefins. These performances ensure that the polyethylenes with enhanced heat resistance are mainly used in pipes for transporting pressurized cold and hot water, both for domestic applications and industrial applications.

Typically, the polyethylenes with enhanced heat resistance used in the layer of the flexible pipe according to the invention have:

a density (according to ASTM D1505 revised in 2010 or ISO 1183 revised in 2012) comprised between 0.930 g/cm$^3$ and 0.965 g/cm$^3$, preferentially between 0.935 g/cm$^3$ and 0.960 g/cm$^3$ and even more preferentially between 0.940 g/cm$^3$ and 0.955 g/cm$^3$, a melt index (according to ASTM D1238 revised in 2010 or ISO 1133 revised in 2011) measured at 190° C. under a mass of 2.16 kg comprised between 0.1 g/10 minutes and 15 g/10 minutes, preferentially between 0.1 g/10 minutes and 5 g/10 minutes and even more preferentially between 0.1 g/10 minutes and 1.5 g/10 minutes, a tensile yield strength (according to ASTM D638 revised in 2010 or ISO 527-2 revised in 2012) comprised between 15 and 35 MPa, preferentially between 20 and 30 MPa and even more preferentially between 25 and 30 MPa, an elongation at break (according to ASTM D638 revised in 2010 or ISO 527-2 revised in 2012) at least greater than 50%, preferentially greater than 300% and even more preferentially greater than or equal to 500%.

The polyethylenes with enhanced heat resistance which may be used in the layer of the flexible pipe according to the invention are notably marketed by Dow Chemical (Dowlex 2377, Dowlex 2388, Dowlex 2344, DGDA-2399), by Total Petrochemical (XSene XRT70), by Chevron Phillips (Marlex HP076, HHM4903), by Exxon Mobil (HD6704) and by Lyondellbasell (Hostalen 4731 B).

The polyethylenes with enhanced heat resistance used in the layer of the flexible pipe according to the invention, for which:
  the melt index (according to ASTM D1238 revised in 2010 or ISO 1133 revised in 2011) measured at 190° C. under the mass of 5.0 kg is less than 2.0 g/10 min, and
  the density (according to ASTM D1505 revised in 2010 or ISO 1183 revised in 2012) is greater than 0.945 g/cm$^3$,
are particularly preferred, since the layer comprising such a polyethylene with enhanced heat resistance particularly well withstands the blistering phenomenon, and this even at high pressures and temperatures encountered during the use of a flexible pipe comprising such a layer for underwater transport of hydrocarbons. Typically, such a layer may actually withstand the blistering phenomenon at pressures greater than 400 bars and at temperatures above 90° C. The inventors have shown that blisters generally appear at lower temperatures and pressures when a layer comprising a polyethylene with enhanced heat resistance which does not have these density and/or melt index characteristics, is used.

Preferably, the tensile yield strengths and the elongations at break of these polyethylenes with enhanced heat resistance are compliant with those described above.

Among polyethylenes with enhanced heat resistance with a density of more than 0.945 g/cm$^3$, those are preferred for which the melt index (according to ASTM D1238 revised in 2010 or ISO 1133 revised in 2011) measured at 190° C. under a mass of 5.0 kg is less than 1.0 g/10 min since the resistance to the blistering phenomenon of a layer comprising them is enhanced. Generally, the melt index measured at 190° C. under a mass of 2.16 kg is then less than 0.25 g/10 min and/or the melt index measured at 190° C. under a mass of 21.6 kg is less than 20 g/10 min.

These polyethylenes with enhanced heat resistance are notably marketed by Dow Chemical (DGDA-2399), by Total Petrochemical (XSene XRT70), by Chevron Phillips (HHM-TR457) and by Lyondellbasell (Hostalen 4731 B).

The layer comprising a polyethylene with enhanced heat resistance of the pipe according to the invention typically comprises:
  a polymeric matrix, and
  optionally discontinuously dispersed components in the polymeric matrix.

By "polymeric matrix", is meant the continuous polymeric phase which forms the layer. The polymeric matrix is a continuous matrix. The layer may optionally comprise discontinuously dispersed components in the polymeric matrix, but which are not part of the polymeric matrix. Such components may for example be fillers such as fibers.

The polymeric matrix of the layer is generally obtained by extrusion of one or several polymers (which will form the polymeric matrix) and optionally of additives (master mixture). During extrusion, certain additives are incorporated into the polymeric matrix, while others do not mix with the polymers forming the polymeric matrix and are discontinuously dispersed in the polymeric matrix, in order to form discontinuously dispersed components in the polymeric matrix.

According to a first alternative, the pipe according to the invention comprises at least one layer for which the polymeric matrix comprises a polyethylene with enhanced heat resistance.

According to this alternative, the layer, the polymeric matrix of which comprises a polyethylene with enhanced heat resistance is generally obtained by extrusion of one or several polymers (which will form the polymeric matrix), one of them being polyethylene with enhanced heat resistance, and optionally in the presence of additives.

The discontinuously dispersed components in the polymeric matrix may optionally comprise polymers, for example polyethylene with enhanced heat resistance. However, a flexible pipe:
  comprising a layer comprising a discontinuously dispersed component in the polymeric matrix (notably fillers such as fibers) comprising or consisting of polyethylene with enhanced heat resistance,
  but the polymeric matrix of which is free from polyethylene with enhanced heat resistance, does not fit the definition of a pipe comprising at least one layer, the polymeric matrix of which comprises a polyethylene with enhanced heat resistance, as defined in this first alternative.

According to a second alternative, the pipe according to the invention comprises at least one layer comprising a discontinuously dispersed component in the polymeric matrix, said component comprising a polyethylene with enhanced heat resistance.

According to this second alternative, a discontinuously dispersed component in the polymeric matrix of the layer comprises a polyethylene with enhanced heat resistance. The component may be a filler such as a fiber. This component comprising the polyethylene with enhanced heat resistance may optionally be used as a catalyst support. As an illustration, when the polymeric matrix of the layer comprises a cross-linked polymer, the component comprising the polyethylene with enhanced heat resistance may be used as a support of the cross-linking catalyst of this polymer. The component comprising the polyethylene with enhanced heat resistance is generally one of the additives of the master mixture used during the extrusion. According to this second alternative, the polymeric matrix of the layer may be free from polyethylene with enhanced heat resistance.

According to a third alternative, the pipe according to the invention comprises at least one layer comprising a discontinuously dispersed component in the polymeric matrix, said component comprising a polyethylene with enhanced heat resistance and the polymeric matrix of which comprises a polyethylene with enhanced heat resistance.

According to this third alternative, the polyethylene with enhanced heat resistance is therefore present both in the polymeric matrix and in a discontinuously dispersed component in the polymeric matrix.

In an embodiment, in the flexible pipe according to the invention, the layer comprises, in addition to the polyethylene with enhanced heat resistance, another polyolefin. Typically, this is the polymeric matrix of the layer which comprises, in addition to the polyethylene with enhanced heat resistance, at least one other polyolefin. By "other polyolefin", is meant that the polyolefin is not a polyethylene with enhanced heat resistance. The polyethylene with enhanced heat resistance may then be the majority polymer (in the layer of the pipe, the mass ratio between the polyethylene with enhanced heat resistance and the sum of the polyethylene with enhanced heat resistance and of the polyolefin then being greater than 50%) or the minority polymer (in the layer of the pipe, the mass ratio between the polyethylene with enhanced heat resistance and the sum of the polyethylene with enhanced heat resistance and of the polyolefin then being less than 50%).

The other polyolefin of the layer is notably a high molecular weight polyethylene, typically a very high molecular weight polyethylene, preferably a ultra high molecular weight polyethylene.

In the sense of the present application:
- a high molecular weight polyethylene ("high molecular weight polyethylene" (HMWPE or HMwPE)) has a weight average molecular weight (Mw) greater than 400,000 g/mol,
- a very high molecular weight polyethylene ("very high molecular weight polyethylene" (VHMWPE or VHMwPE)) has a weight average molecular weight (Mw) greater than 500,000 g/mol (for example the high density polyethylene GHR8110 from Ticona, for which the weight average molecular weight (Mw) is of the order of 600,000 g/mol), preferably greater than 1,000,000 g/mol,
- an ultra high molecular weight polyethylene ("ultra high molecular weight polyethylene" (UHMWPE or UHMwPE)) has a weight average molecular weight (Mw) greater than 3,000,000 g/mol.

These high molecular weight/very high molecular weight/ultra high molecular weight polyethylenes are available commercially.

Generally, in the flexible pipe, the layer comprising a polyethylene with enhanced heat resistance comprises additives, such as antioxidants, anti-UV agents, lubricants and other fillers usually used in thermoplastics.

The flexible pipe according to the invention may comprise a layer consisting of:
- a polyethylene with enhanced heat resistance,
- optionally a high molecular weight polyethylene, and
- optionally additives, such as antioxidants, anti-UV agents, lubricants and fillers.

A flexible pipe comprising a layer comprising a polyethylene with enhanced heat resistance has the following advantages:
the layer comprising a polyethylene with enhanced heat resistance better withstands blistering than a layer comprising a conventional polyethylene, either cross-linked or not.

Therefore, a flexible pipe comprising a layer comprising a polyethylene with enhanced heat resistance may be used at temperatures and/or pressures greater than those used for a flexible pipe comprising a layer based on non-cross-linked polyethylene or based on cross-linked polyethylene.

For example, the inventor showed that at a temperature of 60° C., a flexible pipe comprising a layer comprising a polyethylene with enhanced heat resistance may be used at higher pressures than a flexible pipe comprising a layer comprising a non-cross-linked polyethylene. Further, a flexible pipe comprising a layer comprising a polyethylene with enhanced heat resistance may be used at temperatures above 60° C., which is generally not the case of a flexible pipe comprising a layer comprising a non-cross-linked polyethylene for which the blistering phenomenon is observed at 60° C. at 105 bars for the transport of liquid hydrocarbons and at 60° C. at 210 bars in the case of dry gas transport.

Also, the inventor showed that at a temperature of 90° C., a flexible pipe comprising a layer comprising a polyethylene with enhanced heat resistance may be used at higher pressures than a flexible pipe comprising a layer comprising a cross-linked polyethylene.

The layer comprising a polyethylene with enhanced heat resistance is less expensive than a layer based on PVDF;

The layer comprising a polyethylene with enhanced heat resistance has better resistance to abrasion than a layer based on polyethylene or on a thermoplastic polymer. The resistances to abrasion of a layer comprising a polyethylene with enhanced heat resistance and of a layer based on polyamide 11 are comparable, but the cost of the layer comprising a polyethylene with enhanced heat resistance is lower.

The flexible underwater pipe according to the invention comprises a plurality of layers, i.e. at least two layers. Typically, the flexible underwater pipe according to the invention comprises from the outside to the inside:
an external polymeric sealing sheath,
at least one ply of tensile armors (generally two),
a pressure vault,
an internal polymeric sealing sheath,
optionally a metal carcass,
and optionally one or several intermediate polymeric sealing sheaths between two adjacent layers, provided that at least one of these layers comprises a polyethylene with enhanced heat resistance.

The layer comprising a polyethylene with enhanced heat resistance is at least one of the layers (generally a polymeric sheath) of the flexible pipe.

The flexible underwater pipe according to the invention may comprise other layers in addition to the aforementioned ones. For example, it may comprise:
a holding layer between the external polymeric sheath 10 and the tensile armor plies 12 and 14, or between two tensile armor plies,
and optionally one or several anti-wear layers in polymeric material either in contact with the internal face of the aforementioned holding layer, or with its external face, or with both faces, this anti-wear layer giving the possibility of avoiding wear of the holding layer on contact with metal armors. The anti-wear layers, which are well known to one skilled in the art, are generally made by helically winding one or several ribbons obtained by extrusion of a polymeric material based on polyamide, on polyolefins, or on PVDF ("polyvinylidene fluoride"). It is also possible to refer to document WO 2006/120320 which describes anti-wear layers consisting of polysulfone (PSU), polyethersulfone (PES), polyphenylsulfone (PPSU), polyetherimide (PEI), polytetrafluoroethylene (PTFE), polyetheretherketone (PEEK) or polyphenylene sulfide (PPS) ribbons.

In a flexible underwater pipe according to the invention, the layer(s) comprising a polyethylene with enhanced heat resistance may notably be:
the internal polymeric sealing sheath, and/or
one or several intermediate polymeric sealing sheaths located between two other adjacent layers, and/or
the external polymeric sealing sheath.

In an embodiment, the intermediate polymeric sealing sheath located between two other adjacent layers and comprising a polyethylene with enhanced heat resistance is an anti-wear layer.

Indeed, as explained above, the layer comprising a polyethylene with enhanced heat resistance is less subject to the blistering phenomenon, is therefore particularly suitable for being used as a polymeric sealing sheath (in order to avoid leaking of hydrocarbons through the formed cracks or blisters into the sea on the one hand and the inflow of seawater into the pipe on the other hand).

Further, as explained above, a layer comprising a polyethylene with enhanced heat resistance has good resistance to abrasion, notably better than that of a layer in polyolefin, and comparable with that of a layer in polyamide (more expensive than PE-RT). As resistance to abrasion is a sought property for an external sheath, the layer comprising a polyethylene with enhanced heat resistance is particularly suitable for being used as an external sealing sheath.

Moreover, when the pipe is used at temperatures below 60° C., its intermediate polymeric sealing sheath is generally in polyethylene, but for higher temperatures, it is generally in PVDF, clearly more expensive. Thus, when the pipe has to be used at temperatures above 60° C., it is therefore advantageous to use as an intermediate polymeric sheath, a layer comprising a polyethylene with enhanced heat resistance (less expensive than PVDF, but the performances of which in resistance to temperature are considerably greater than a polyethylene).

For example, the flexible pipe according to the invention may comprise from the outside to the inside:
an external polymeric sealing sheath,
at least one ply of tensile armors,
a pressure vault,
an internal polymeric sealing sheath comprising a polyethylene with enhanced heat resistance,
possibly a metal carcass.

In a second example, the flexible pipe according to the invention may comprise, from the outside to the inside:
an external polymeric sealing sheath comprising a polyethylene with enhanced heat resistance,
at least one ply of tensile armors,
a pressure vault,
an internal polymeric sealing sheath,
optionally a metal carcass.

In a third example, the flexible pipe according to the invention may comprise from the outside to the inside:
an external polymeric sealing sheath,
at least one ply of tensile armors,
a pressure vault,
an internal polymeric sealing sheath,
optionally a metal carcass,
and one or several intermediate polymeric sealing sheaths comprising a polyethylene with enhanced heat resistance between two adjacent layers.

The flexible pipe according to the invention may also comprise several layers (typically two or three) comprising a polyethylene with enhanced heat resistance. For example, the flexible pipe according to the invention may comprise from the outside to the inside:
an external polymeric sealing sheath comprising a polyethylene with enhanced heat resistance,
at least one ply of tensile armors,
a pressure vault,
an internal polymeric sealing sheath comprising a polyethylene with enhanced heat resistance,
optionally a metal carcass.

According to a second object, the invention relates to a method for preparing the aforementioned flexible underwater pipe, comprising the following steps:
a) extrusion for forming a layer comprising a polyethylene with enhanced heat resistance, the extrusion being optionally carried out on another layer,
b) optionally assembling the layer obtained in step a) with at least one other layer.

The extrusion of a layer comprising a polyethylene with enhanced heat resistance is easy to apply, while extrusion of a layer in cross-linked polyethylene is generally difficult. Thus, the method for preparing a flexible pipe comprising a layer comprising a polyethylene with enhanced heat resistance is simpler than the method for preparing a flexible pipe comprising a layer comprising a cross-linked polyethylene.

The extrusion step a) may be carried out with any method known to one skilled in the art, for example by using a single screw or twin screw extruder. Polyethylene with enhanced heat resistance may easily be co-extruded, unlike cross-linked polyethylene.

The preparation of the layer comprising a polyethylene with enhanced heat resistance does not require any cross-linking step (and no expensive cross-linking device is required), unlike the preparation of a layer in cross-linked polyethylene. Thus, the method for preparing a flexible pipe comprising a layer comprising a polyethylene with enhanced heat resistance is faster, simpler and less expensive than the method for preparing a flexible pipe comprising a layer comprising a cross-linked polyethylene.

When the layer comprises several polymers (for example a polyethylene with enhanced heat resistance and a polyethylene of high molecular weight) the mixing of both polymers may be carried out before or during the extrusion.

The layer obtained at the end of step a) is typically tubular, generally has a diameter from 50 mm to 600 mm, preferably from 50 to 400 mm, a thickness of 1 mm to 150 mm, preferentially from 40 to 100 mm and a length from 1 m to 10 km.

The method optionally comprises the step b) for assembling the layer obtained during step a) with at least one other layer in order to form the flexible underwater pipe, notably one of the aforementioned layers.

The layers are thus assembled in order to form a flexible underwater pipe of the unbonded type, as described in the normative documents published by the American Petroleum Institute (API), API 17J and API RP 17B.

According to a first alternative, the extrusion of step a) is not carried out on another layer of the flexible pipe, but independently, and the layer obtained at the end of the extrusion is then added and calendered with at least one other layer during step b). The method for preparing the flexible pipe then comprises the steps for:
a) extrusion in order to form a layer comprising a polyethylene with enhanced heat resistance,
b) assembling the obtained layer in step a) with at least one other layer.

For example, when the layer comprises a polyethylene with enhanced heat resistance is the internal polymeric sealing sheath, the layer obtained at the end of step a) is then added and typically calendered with a pressure vault, at least one ply of tensile armors (generally two plies of armors) and an external polymeric sheath. With this example, it is notably possible to make flexible pipes with a smooth bore.

According to a second alternative, the extrusion of step a) is carried out on another layer of the flexible pipe. The method for preparing the flexible pipe then comprises the steps for:
a) extrusion in order to form a layer comprising a polyethylene with enhanced heat resistance, the extrusion being carried out on another layer,
b) optionally assembling the layer obtained in step a) with at least one other layer.

In a first embodiment of this second alternative, the method for preparing the flexible pipe comprises the steps for:

a) extrusion in order to form a layer comprising a polyethylene with enhanced heat resistance, the extrusion being carried out on another layer, b) assembling the layer obtained in step a) with at least one other layer.

For example, when the layer comprising a polyethylene with enhanced heat resistance is the internal polymeric sealing sheath, the extrusion is typically carried out on the carcass, in order to obtain an assembly (carcass/layer comprising polyethylene with enhanced heat resistance) which will then be added and calendered with at least one other layer during step b), typically a pressure vault, at least one ply of tensile armors (generally two armor plies) and an external polymeric sheath. With this example it is notably possible to make rough-bore flexible pipes.

Also, when the layer comprising a polyethylene with enhanced heat resistance is an intermediate polymeric sheath, the extrusion of the layer is typically carried out on the whole of the layers of the pipe which are more internal than said intermediate polymeric sheath in the flexible pipe obtained by the method, in order to obtain an assembly (intermediate polymeric sheath comprising a polyethylene with enhanced heat resistance/layers of the pipe which are more internal than said intermediate polymeric sheath in the flexible pipe obtained by the method) which will then be added and calendered with the other layer(s) of the pipe which is(are) more external in the flexible pipe obtained by the method.

As an illustration, if the layer comprising a polyethylene with enhanced heat resistance is an intermediate polymeric sheath between the pressure vault and a ply of tensile armors, the extrusion of the layer will be typically carried out on the pressure vault/internal polymeric sealing sheath/optional carcass assembly (the layers being listed from the outside to the inside, the extrusion being carried out on the outer layer of this assembly, i.e. on the pressure vault), in order to obtain an assembly (intermediate polymeric sheath comprising a polyethylene with enhanced heat resistance/ pressure vault/internal polymeric sealing sheath/optional carcass) which will then be added and calendered with at least one ply of tensile armors (generally two armor plies) and an external polymeric sheath.

According to another example, if the layer comprising a polyethylene with enhanced heat resistance is an intermediate polymeric sheath between the armor ply(ies) and a polymeric layer (for example an anti-wear layer), the extrusion of the layer would be typically achieved on the assembly of at least one tensile armor ply/pressure vault/internal polymeric sealing sheath/optional carcass (the layers being listed from the outside to the inside, the extrusion being achieved on the exterior layer of this assembly, i.e. on the pressure vault), in order to obtain an (intermediate polymeric sheath comprising a polyethylene with enhanced heat resistance/at least one ply of tensile armors/pressure vault/internal polymeric sealing sheath/optional carcass) assembly which will then be added and calendered with an external polymeric sheath.

In a second embodiment of this second alternative, the method for preparing the flexible pipe comprises the step for:

a) extrusion in order to form a layer comprising a polyethylene with enhanced heat resistance, the extrusion being carried out on another layer.

For example, when the layer comprising a polyethylene with enhanced heat resistance is the external polymeric sealing sheath, the extrusion is typically carried out on an assembly of layers: at least one ply of tensile armors (generally two armor plies)/pressure vault/internal polymeric sealing sheath/optionally carcass (the layers being listed from the outside to the inside, the extrusion being carried out on the outer layer of this assembly, i.e. on a ply of tensile armors).

According to a third object, the object of the invention is a flexible underwater pipe which may be obtained with the aforementioned method.

According to a fourth object, the object of the invention is the use of the aforementioned flexible underwater pipe for transporting hydrocarbons.

According to a fifth object, the object of the invention is the use of a polyethylene with enhanced heat resistance as defined above in a layer of a flexible underwater pipe intended for transporting hydrocarbons in order to increase the resistance of said layer to blistering.

BRIEF DESCRIPTION OF THE DRAWINGS

Other particularities and advantages of the invention will become apparent upon reading the description made hereafter of particular embodiments of the invention, given as an indication but not as a limitation, with reference to the FIGURE.

DESCRIPTION OF PREFERRED EMBODIMENTS

Figure 1:
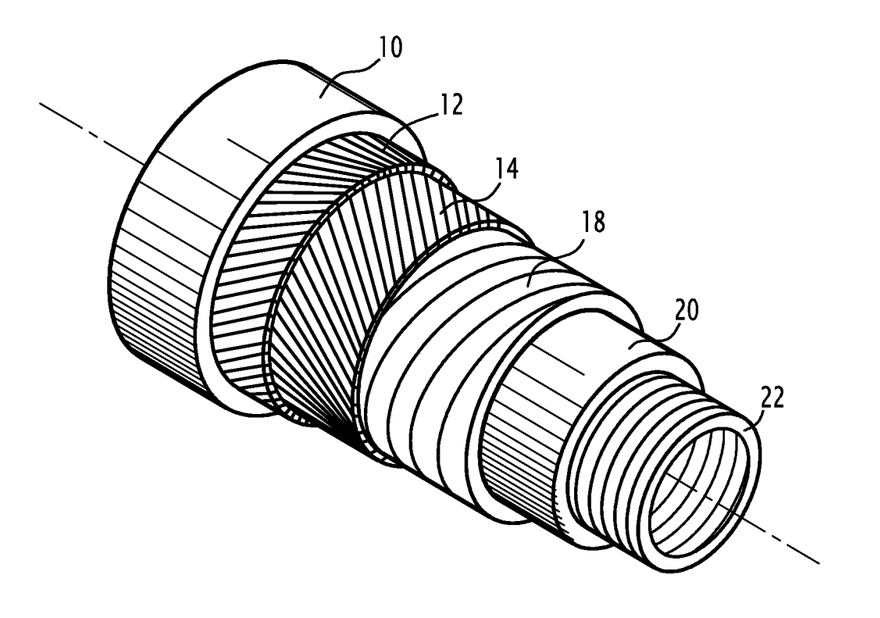

The FIGURE is a partial schematic perspective view of a flexible pipe according to the invention. It illustrates a pipe according to the invention comprising, from the outside to the inside:
- an external polymeric sealing sheath 10,
- an external ply of tensile armors 12,
- an internal ply of tensile armors 14 wound in the direction opposite to the external ply 12,
- a pressure vault 18 for spread-loading the radial forces generated by the pressure of the transported hydrocarbons,
- an internal polymeric sealing sheath 20, and
- an internal carcass 22 for spread-loading the crushing radial forces.

No intermediate polymeric sheath is illustrated in the FIGURE. As explained above, there would be no departure from the field of the present invention if the pipe comprised one or several intermediate polymeric sheaths. When no intermediate polymeric sheath is present in the pipe, like the one illustrated in the FIGURE, it is the external polymeric sealing sheath 10 and/or the internal polymeric sealing sheath 20 which comprise(s) a polyethylene with enhanced heat resistance.

Because of the presence of the internal carcass 22, this pipe is said to be a rough-bore pipe. The invention may also be applied to a smooth-bore pipe not including any internal carcass.

Also, there would be no departure from the field of the present invention by suppressing the pressure vault 18, provided that the helical angles of the wires making up the armor plies 12, 14 are close to 55° and in the opposite direction.

The armor plies 12, 14 are obtained by winding with a long pitch a set of wires in a metal or composite material, with a generally substantially rectangular section. The invention would also apply if these wires had a circular or complex geometrical section, for example of the self-stapled T type. In the FIGURE, only two armor plies 12 and 14 are illustrated, but the pipe may also include one or several additional pairs of armors. The armor ply 12 is said to be external since it is the last here, starting from the inside of the conduit, before the external seal sheath 10.

The flexible pipe may also comprise layers not illustrated in the FIGURE, such as:
- a holding layer between the external polymeric sheath 10 and the tensile armor plies 12 and 14, or between two tensile armor plies,
- one or several anti-wear layers in a polymeric material in contact either with the internal face of the aforementioned holding layer or with its external face, or with both faces.

EXAMPLE

Blistering Resistance Test

Blistering resistance tests according to the API17J standard were conducted on PE-RT samples as mentioned earlier (Dow 2377, RT70) 20 times subject to a temperature of 90° C. under a pressure of 250 bars while having been saturated in diesel (reference liquid for the tests) without exhibiting any blistering (observation with the naked eye and then with an optical microscope (a binocular microscope LEICA MZ 125)).

As a comparison, the limits of the polyethylene materials (Finathene® 3802 (Petrofina)) and cross-linked polyethylene (Crossflex® (Technip)) materials used in applications of flexible pipes because of the blistering phenomenon are respectively:
- a temperature of 60° C. and a pressure of 105 bars in the presence of liquid hydrocarbons, or 210 bars in the presence of only dry gas, or
- a temperature of 90° C. and a pressure of 175 bars in the presence of liquid hydrocarbons.

Thus, the use of a polyethylene with enhanced resistance as a sealing sheath gives the possibility:
- for a temperature of 60° C., of increasing the pressure use range as compared with polyethylene presently used,
- for temperatures above 60° C., i.e. in temperature ranges reserved up to now for cross-linked polyethylene, of increasing the pressure use range as compared with cross-linked polyethylene.

Other blistering resistance tests according to the API17J standard were conducted on PE-RT samples with a thickness of 7 mm as mentioned earlier (Total Petrochemical XSene XRT70) 20 times subject to a temperature of 90° C. under a pressure of 300 bars without exhibiting any blistering (observation with the naked eye and then with an optical microscope (binocular microscope LEICA MZ 125)).

A cross-linked polyethylene material (Crossflex® (Technip)) was subject to the same conditions. Many blisters appeared.

Other blistering resistance tests according to the API17J standard were conducted on PE-RT samples with a thickness of 7 mm of different natures, 20 times subject to a given temperature and pressure. The characteristics of the PE-RTs and the results of the blistering phenomenon resistance are provided in the following table.

TABLE

Characteristics of the PE-RTs used and results of the blistering resistance tests.

| Grade | Dowlex 2344 | Dowlex 2388 | XRT 70 |
|---|---|---|---|
| Provider | Dow Chemical | Dow Chemical | Total Petrochem |
| Co-monomer | Octene C8 | Octene C8 | Hexene C6 |
| Type according to ISO 15494-1 | I | II | II |
| Density (g/cm³) | 0.933 | 0.941 | 0.947 |
| Melt index (190° C.) | 0.7 g/10 min (2.16 kg) 2.2 g/10 min (5 kg) | 0.54 g/10 min (2.16 kg) 1.9 g/10 min (5 kg) | 0.7 g/10 min (5 kg) |
| Tensile yield strength (MPa) | 16.5 | 20 | 23 |
| Tensile breaking strength (MPa) | 34 | 37 | |
| Elongation at break (%) | >800 | 780 | ≥350 |
| Flexure modulus (MPa) | 550 (580 rigid) | 660 | 750 850 (rigid) |
| Blistering phenomenon | Occurrence of blisters at a pressure of 250 bars and at a temperature of 90° C. | Occurrence of blisters at a pressure of 300 bars and at a temperature of 90° C. | No blisters observed at a temperature of 400 bars and at a temperature of 90° C. |

These results show that a PE-RT for which the density is greater than 0.945 g/cm³ and for which the melt index measured at 190° C. under a mass of 5.0 kg is less than 2.0 g/10 min (PE-RT XRT 70) better withstands the blistering phenomenon than a PE-RT not having these characteristics (PE-RT Dowlex with densities of less than 0.945 g/cm³).

What is claimed is:

1. A method for transporting hydrocarbons wherein the hydrocarbons are transported at a temperature greater than 60° C. and at a pressure greater than 200 bar in a flexible underwater pipe comprising a plurality of layers, at least one layer of which comprises a polymeric matrix comprising a polyethylene with enhanced heat resistance for which the melt index measured at 190° C. under a mass of 5.0 kg is less than 2.0 g/10 min, the density is greater than 0.945 g/cm3, the threshold yield strength is between 20 and 30 MPa, and the elongation at break is greater than 300%,
wherein the polyethylene with enhanced heat resistance meets ASTM F2769-10 revised in 2010 or meets ISO 24033 revised in 2009,
and
wherein the at least one layer, the polymeric matrix of which comprises the polyethylene with enhanced heat resistance, withstands blistering as measured according to the standard API17J.

2. The method according to claim 1, wherein the polymeric matrix is free of dispersed components.

3. The method according to claim 1, wherein the at least one layer which comprises a polymeric matrix comprising the polyethylene with enhanced heat resistance absorbs pressurized gases during transport and allows them to diffuse out of the layer when the pressure in the flexible pipe is reduced.

4. The method according to claim 1, wherein the hydrocarbons are transported at a temperature greater than 90° C.

5. The method according to claim 1, wherein the polyethylene with enhanced heat resistance is non cross-linked.

6. The method according to claim 1, wherein the melt index measured at 190° C. of the polyethylene with enhanced heat resistance is:

less than 1.0 g/10 min under a mass of 5.0 kg, and/or less than 0.25 g/10 min under a mass of 2.16 kg, and/or less than 20 g/10 min under a mass of 21.6 kg.

7. The method according to claim 1, wherein the polyethylene with enhanced heat resistance is obtained by polymerization of ethylene and of an α-olefin selected from 1-butene, 1-hexene and 1-octene.

8. The method according to claim 1, wherein the polymeric matrix of the at least one layer of the flexible underwater pipe comprises a polyethylene with enhanced heat resistance and another polyolefin.

9. The method according to claim 8, wherein, in the polymeric matrix comprising a polyethylene with enhanced heat resistance and another polyolefin, the mass ratio between the polyethylene with enhanced heat resistance and the sum of the polyethylene with enhanced heat resistance and of the polyolefin is greater than 50%.

10. The method according to claim 8, wherein, in the polymeric matrix comprising a polyethylene with enhanced heat resistance and another polyolefin, the mass ratio between the polyethylene with enhanced heat resistance and the sum of the polyethylene with enhanced heat resistance and of the polyolefin is less than 50%.

11. The method according to claim 8, wherein the other polyolefin is a high molecular weight polyethylene.

12. The method according to claim 8, wherein the other polyolefin is a very high molecular weight polyethylene.

13. The method according to claim 1, wherein the flexible underwater pipe comprises, from the outside to the inside:
an external polymeric sealing sheath,
at least one ply of tensile armors,
a pressure vault,
an internal polymeric sealing sheath,
optionally a metal carcass,
and optionally one or several intermediate polymeric sealing sheaths between two adjacent layers,
provided that the polymeric matrix of at least one of the polymeric sealing sheaths comprises the polyethylene with enhanced heat resistance.

14. The method according to claim 1, wherein said layer(s), the polymeric matrix of which comprises a polyethylene with enhanced heat resistance is(are):
the internal polymeric sealing sheath, and/or
one or several intermediate polymeric sealing sheaths located between two adjacent layers, and/or
the external polymeric sealing sheath.

15. The method according to claim 1, wherein said layer, the polymeric matrix of which comprises a polyethylene with enhanced heat resistance is the internal polymeric sealing sheath.

* * * * *